Figure 1:
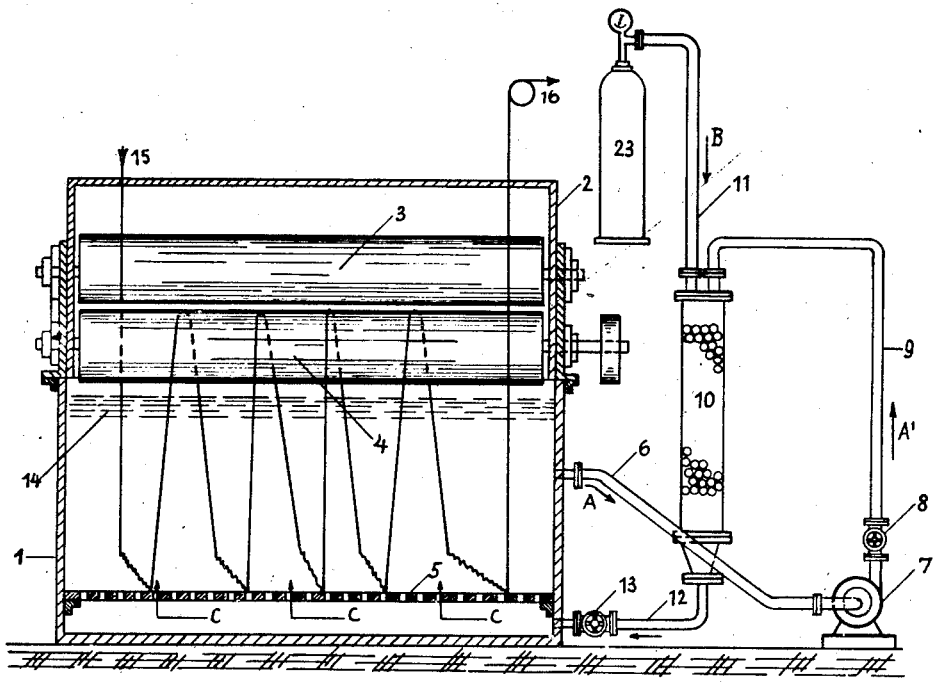

Helmuth Korte
Wilhelm Waibel
Johann Metzger
INVENTORS

Patented Aug. 14, 1945

2,382,726

UNITED STATES PATENT OFFICE 2,382,726

APPARATUS FOR THE CHLORINATION OF BAST FIBERS

Helmuth Korte, Wilhelm Waibel, and Johann Metzger, Frankfort-on-the-Main, Germany; vested in the Alien Property Custodian Application February 6, 1941, Serial No. 377,698
In Germany February 21, 1939

4 Claims. (Cl. 68—22)

The present invention relates to an apparatus for the chlorination of bast fibers.

The chlorination of piece goods is known. The usual method was to impregnate the piece goods first with an acid and then to treat them directly with hypochlorite baths. The chlorine consumed had to be replaced by addition of concentrated hypochlorite solutions whereby the volume of the liquor was considerably increased in the course of time. Consequently, the whole process was either limited to a certain period of time or part of the chlorine liquor had to be removed from time to time without being utilized.

The chlorination with the aid of chlorine water too has already been described. In this case the usual method was to prepare to chlorine water separately and to pour this solution into the impregnating apparatus, a proceeding which involved loss of chlorine from the solution before the chlorine could be used, and much trouble due to the presence of chlorine in the atmosphere. Furthermore, the concentration of chlorine in the said chlorine water diminished to such an extent that a uniform penetration of the goods was not possible particularly in the case of tightly woven fabrics and goods consuming a large quantity of chlorine.

Now, we have found that these inconveniences of the chlorination of piece goods from vegetable, animal and artificial fibers or mixtures thereof are avoided by impregnating the goods in an impregnating apparatus with freshly prepared, supersaturated chlorine water and by continuously compensating the chlorine consumed by introduction of chlorine gas. For this purpose the apparatus for the preparation of the chlorine water is preferably constructed in such a manner that it yields strongly supersaturated chlorine water and is combined with a rope impregnating machine or open width machine so as to form a closed system. This impregnating machine is advantageously constructed so that the goods are repeatedly and alternatively impregnated with the solution in a tank and squeezed off outside the solution in this tank. Thereby a uniform penetration of the goods is guaranteed, particularly also in view of the fact that high concentrations of chlorine are obtained by the direct introduction of the supersaturated chlorine water. A perforated bottom is preferably mounted in the tank below which bottom the supersaturated solution enters the tank. The solution penetrates through the perforated bottom and, rising slowly, quickly yields chlorine so that at its surface it is no longer supersaturated. Loss of chlorine and trouble due to the presence of chlorine in the atmosphere are, therefore, avoided.

The material may be treated in the form of hanks or in the form of wide goods. Generally only heavy goods which are not suitable for a treatment in the rope or are liable to crease will be treated in the open width.

Figure 2:
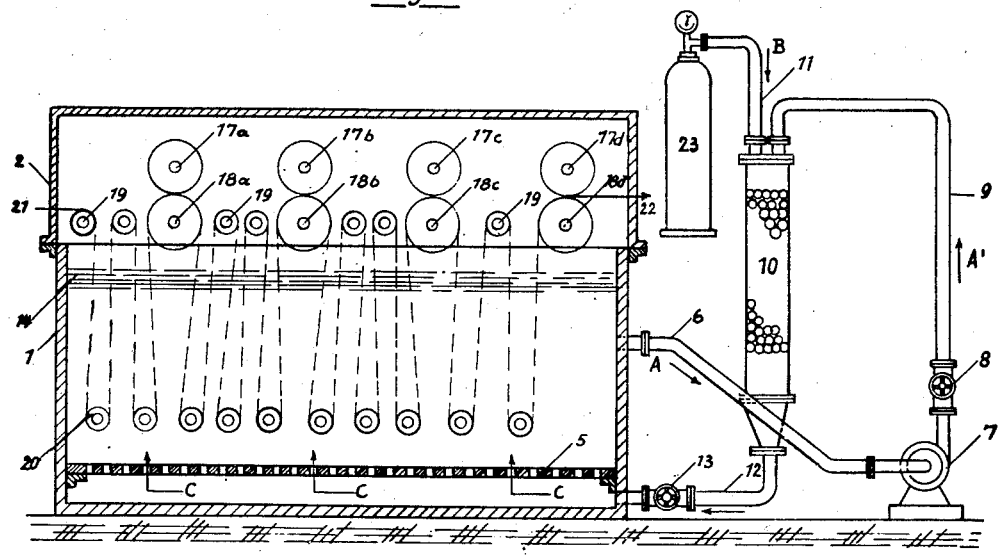

The accompanying drawing illustrates by way of example two devices for carrying out our invention, in which:

Figure 1 is a vertical sectional view through a rope or strand treating apparatus, and showing in elevation an improved chlorination apparatus associated therewith; Figure 2 is a vertical sectional view through an apparatus for the treatment of web material, and showing in elevation the improved chlorination associated therewith.

The device according to Fig. 1 consists of a tank 1 and, mounted above that tank, a casing 2 provided with two rollers 3 and 4. A perforated bottom 5 is mounted in the lower part of tank 1. From tank 1 near the level of the liquid contained therein a suction pipe 6 leads to pump 7 and from there a high-pressure piping 9 leads to a valve 8 and the chlorination column 10. Through this piping the liquid is conducted as shown by arrows A and A'. This column essentially consists of a vertical tube into which, in addition to the piping 9, a pipe 11 opens. Through this pipe chlorine is introduced under pressure (arrow B), preferably from a stock bottle 23, into the liquid in the upper part of the column 10 and mixes with the liquid on its passage through column 10 charged with filling bodies, advantageously of equal size. Liquid and chlorine gas enter the column from above, the pressure of the gas being preferably higher than that of the liquid which practically entirely fills the free space between the filling bodies in the column. Supersaturated chlorine water leaves the column 10 at its lower end through pipe 12 and discharges into tank 1 through valve 13 below the perforated bottom 5. (Arrows C.)

The goods, for instance, material in the rope are introduced into the casing 2 and the tank 1 at 15, removed from the liquid by rollers 3 and 4 and squeezed, then returned into the liquid, lifted again and so forth. The material advances spirally through the device and leaves it by way of a roller 16.

The device according to Fig. 2 is very similar to that of Fig. 1 and shows instead of a single pair of rollers 3 and 4 several pair of rollers (17a to d and 18a to d). Between these squeezing rollers there are mounted a series of guide rollers 19 in the same height as rollers 18a to 18d and further series of guide rollers 20 in tank 1 near the perforated bottom 5. The material, for instance a web of fabric in open width enters the casing 2 at 21 and travels, alternately upward and downward, over guide rollers 19 and 20 while being squeezed between the pairs of rollers 17a to d and 18a to d. The material leaves the device at 22 and may be after-treated in the usual manner, for instance, in an alkaline bath.

The chlorine liquor which is introduced into tank 1 at 13 yields during its rise up to level 14 part of its active chlorine and, when it reaches the said level, is no longer supersaturated. By the fact that the liquor, directly after having lost its active chlorine, is charged again with chlorine by application of pressure it is possible to cause the chlorine to act particularly quickly and strongly on the goods and, thereby, to avoid losses of chlorine to a large extent.

We claim:

1. A device for treating piece goods from vegetable, animal, and artificial fibers or mixtures thereof, with chlorinating liquors, the said device consisting of a tank for the chlorinating liquid, a perforated bottom adjacent the lower part of the tank, means above the tank for alternately conducting the goods through the liquid and for squeezing off said liquid, an outlet disposed a substantial distance above the perforated bottom for conducting the liquid from the tank, a chlorination column adjacent the tank, a pipe leading from said outlet in the tank to the chlorination column, a second pipe leading from said chlorination column to an inlet opening for the restored liquid, said inlet opening entering the tank beneath the perforated bottom thereof, means for circulating liquid through said first pipe, column, second pipe, and tank in the order named, and valve means individual to each of said pipes for regulating the flow and liquid pressure in said column whereby the degree of chlorine saturation of the liquid is controlled.

2. Apparatus for treating bast fibers from vegetable, animal and artificial fibers or mixtures thereof with chlorinating liquors, which comprises a bleaching tank for impregnating the goods with said liquors, means in said tank for continuously transporting said goods therethrough, an inlet at the bottom of said tank for said chlorinating liquors, an outlet disposed a substantial distance above said inlet in said tank for conducting the used liquors from the tank, a chlorinating column for producing super-saturated chlorine water and provided with an inlet and an outlet, connecting means between the outlet of the chlorination column and the inlet in the tank, a second connecting means between the outlet of the tank and the inlet of said chlorination column, a valve in each of said connecting means for regulating the flow and liquor pressure in said column, and means located in said second connecting means for circulating said liquors from the tank outlet, under pressure through said chlorination column and into said tank inlet, thereby maintaining the chlorinating liquors near their surface in said tank below the saturation point.

3. A device for treating piece goods with a chlorinating liquor including in combination, a tank in which is maintained a level of chlorinating liquor, means for advancing the piece goods through the tank and for alternately immersing and then withdrawing and wringing the goods a plurality of times in their travel through the tank, a chlorination column adjacent the tank and a supply of chlorine gas for said column, a circulating system for circulating liquor from a tank outlet disposed a substantial distance above the bottom of the tank, to the top of the column, through the column, and then from the bottom of the column to an inlet at the bottom of the tank, means for regulating the flow of the liquor into the column, and a second means for regulating the flow of the liquor from the column, whereby the pressure intermediate said regulating means will control the degree of chlorine saturation, and whereby the saturated liquor entering at the bottom of the tank becomes substantially unsaturated in the goods while rising to said tank outlet.

4. A device for treating piece goods with a chlorinating liquor including in combination, a tank in which is maintained a level of chlorinating liquor; means for advancing the piece goods through the tank and for alternately immersing and then withdrawing and wringing the goods a plurality of times in their travel through the tank; a chlorination column adjacent the tank and a supply of chlorine gas for said column for saturating the liquor while in the column; a closed circulating system including said tank, a pump, a pipe leading from a tank outlet disposed a substantial distance above the bottom of the tank to the pump, a second pipe from the pump to the chlorination column, and a third pipe leading from the said column to the tank and entering said tank at a level adjacent the bottom thereof, whereby the saturated liquor entering at the bottom of the tank becomes substantially unsaturated by the goods while rising to said tank outlet; a perforated bottom in the tank above the point at which said last-mentioned pipe enters; and valve means in said second and third pipes respectively for regulating the flow and liquor pressure within said column to control the degree of chlorine saturation.

HELMUTH KORTE.
WILHELM WAIBEL.
JOHANN METZGER.